United States Patent
Gramme et al.

(10) Patent No.: US 7,516,794 B2
(45) Date of Patent: Apr. 14, 2009

(54) PIPE SEPARATOR FOR THE SEPARATION OF FLUIDS, PARTICULARLY OIL, GAS AND WATER

(75) Inventors: Per Eivind Gramme, Porsgunn (NO); Ivar Haukom, Oslo (NO)

(73) Assignee: Norsk Hydro ASA, Oslo (NO)

( * ) Notice: Subject to any disclaimer, the term of this patent is extended or adjusted under 35 U.S.C. 154(b) by 317 days.

(21) Appl. No.: 10/522,984

(22) PCT Filed: Aug. 1, 2003

(86) PCT No.: PCT/NO03/00265

§ 371 (c)(1),
(2), (4) Date: Aug. 5, 2005

(87) PCT Pub. No.: WO2004/016907

PCT Pub. Date: Feb. 26, 2004

(65) Prior Publication Data

US 2006/0124313 A1 Jun. 15, 2006

(30) Foreign Application Priority Data

Aug. 16, 2002 (NO) .................................. 20023919

(51) Int. Cl.
*E21B 7/12* (2006.01)
*E21B 29/12* (2006.01)
(52) U.S. Cl. .................. 166/357; 166/267; 210/248; 96/55
(58) Field of Classification Search ............... 166/357, 166/267, 351, 366, 368; 96/55; 210/734
See application file for complete search history.

(56) References Cited

U.S. PATENT DOCUMENTS

| 3,384,169 | A | * | 5/1968 | Leonard | 166/357 |
| 3,556,218 | A | * | 1/1971 | Talley et al. | 166/265 |
| 3,590,919 | A | * | 7/1971 | Talley, Jr. | 166/357 |
| 3,608,630 | A | * | 9/1971 | Wooden et al. | 166/357 |

(Continued)

FOREIGN PATENT DOCUMENTS

EP 0 331 295 9/1989

(Continued)

OTHER PUBLICATIONS

Norwegian Search Report, issued May 2, 2003.

(Continued)

*Primary Examiner*—Thomas A Beach
(74) *Attorney, Agent, or Firm*—Wenderoth, Lind & Ponack, LLP

(57) ABSTRACT

A pipe separator for the separation of fluids, for example the separation of oil, gas and water in connection with the extraction and production of oil and gas from formations beneath the sea bed. The pipe separator includes a pipe-shaped separator body (1) with an inlet and outlet that principally corresponds to a transport pipe (4, 7) to which the pipe separator is connected. The pipe separator further includes a pipe bend or loop (2) arranged in the pipe separator or in connection with its outlet to form a downstream fluid seal in relation to the pipe separator body (1), which is designed to maintain a fluid level in the pipe separator, but which also allows the pipe separator (1) and the loop (2) to be pigged.

6 Claims, 5 Drawing Sheets

U.S. PATENT DOCUMENTS

| | | | | |
|---|---|---|---|---|
| 3,881,549 A * | 5/1975 | Thomas | ........................ | 166/357 |
| 4,435,872 A * | 3/1984 | Leikam | .................. | 15/104.062 |
| 4,705,114 A | 11/1987 | Schroeder et al. | | |
| 5,232,475 A * | 8/1993 | Jepson | ......................... | 95/260 |
| 5,310,006 A * | 5/1994 | Freitas et al. | ................ | 166/339 |
| 6,059,039 A * | 5/2000 | Bednar et al. | ................ | 166/344 |
| 6,129,150 A * | 10/2000 | Lima | ........................ | 166/357 |
| 6,234,030 B1 * | 5/2001 | Butler | ..................... | 73/861.04 |
| 6,267,182 B1 * | 7/2001 | Lima | ........................... | 166/335 |
| 6,276,455 B1 * | 8/2001 | Gonzalez | ..................... | 166/357 |
| 6,277,286 B1 | 8/2001 | Søntvedt et al. | | |
| 6,533,032 B1 * | 3/2003 | Seixas et al. | .................. | 166/70 |
| 6,640,901 B1 * | 11/2003 | Appleford et al. | ............ | 166/357 |
| 6,672,391 B2 * | 1/2004 | Anderson et al. | ............ | 166/357 |
| 7,093,661 B2 * | 8/2006 | Olsen | ......................... | 166/357 |
| 2005/0006086 A1 | 1/2005 | Gramme | | |
| 2007/0102369 A1 * | 5/2007 | Gramme et al. | ............. | 210/748 |

FOREIGN PATENT DOCUMENTS

| | | |
|---|---|---|
| GB | 2239193 | 6/1991 |
| JP | 2001-259346 | 9/2001 |
| RU | 2 126 288 | 2/1999 |
| SU | 1741939 | 6/1992 |
| WO | 98/41304 | 9/1998 |
| WO | 03/033872 | 4/2003 |

OTHER PUBLICATIONS

Russian Office Action, issued May 3, 2007.

* cited by examiner

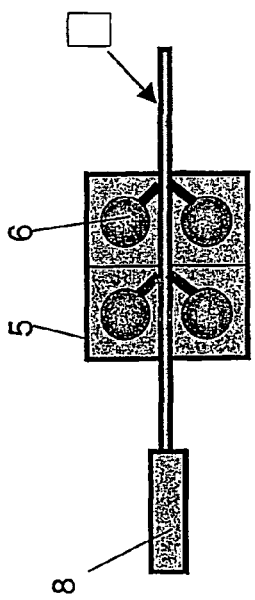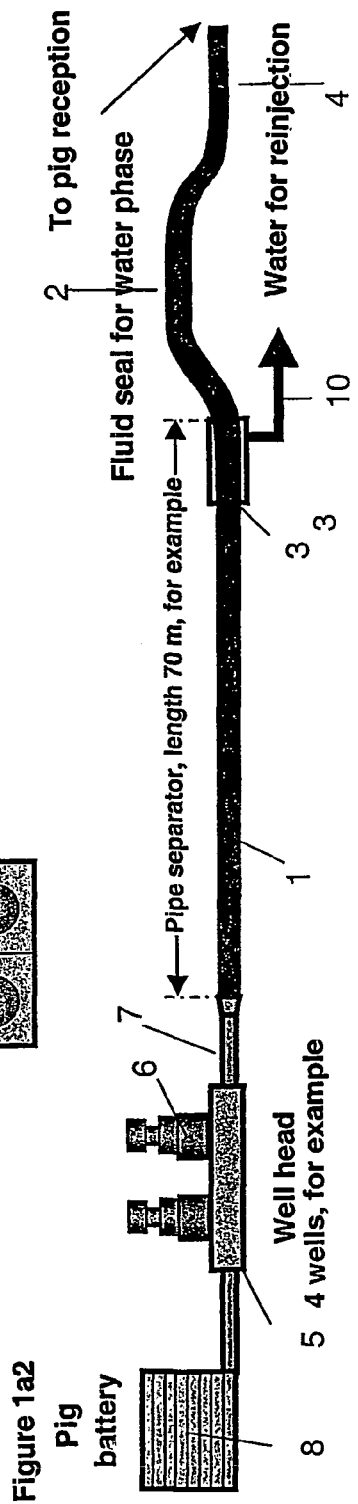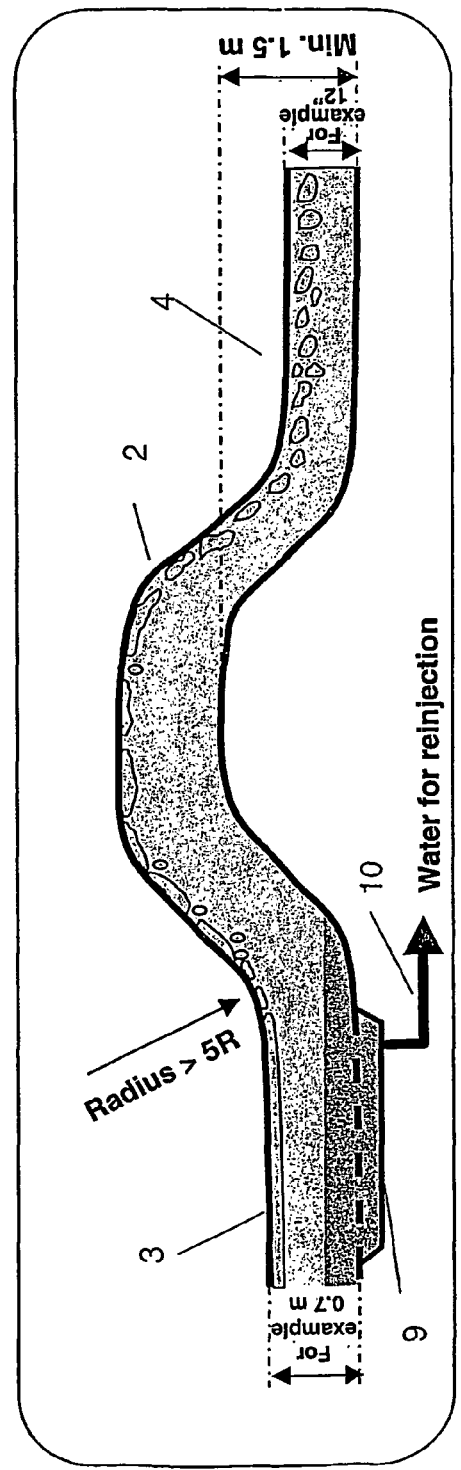

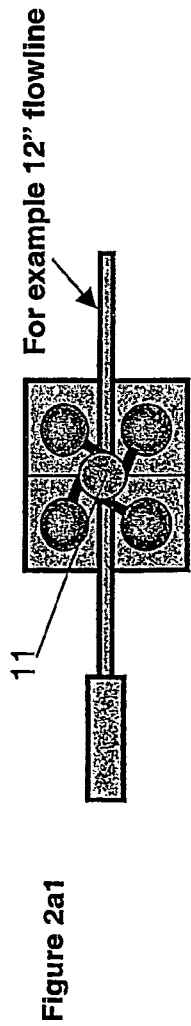
Figure 2a1
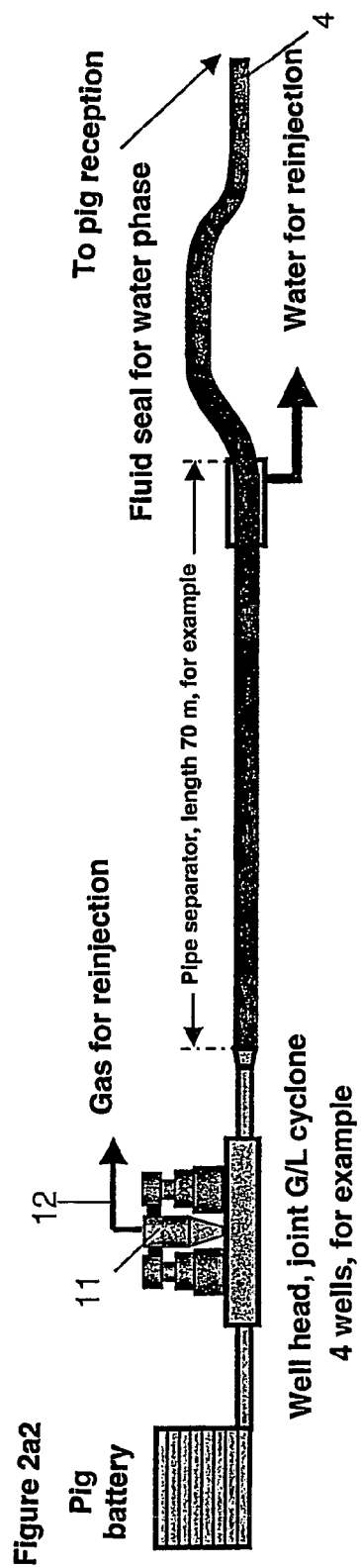
Figure 2a2
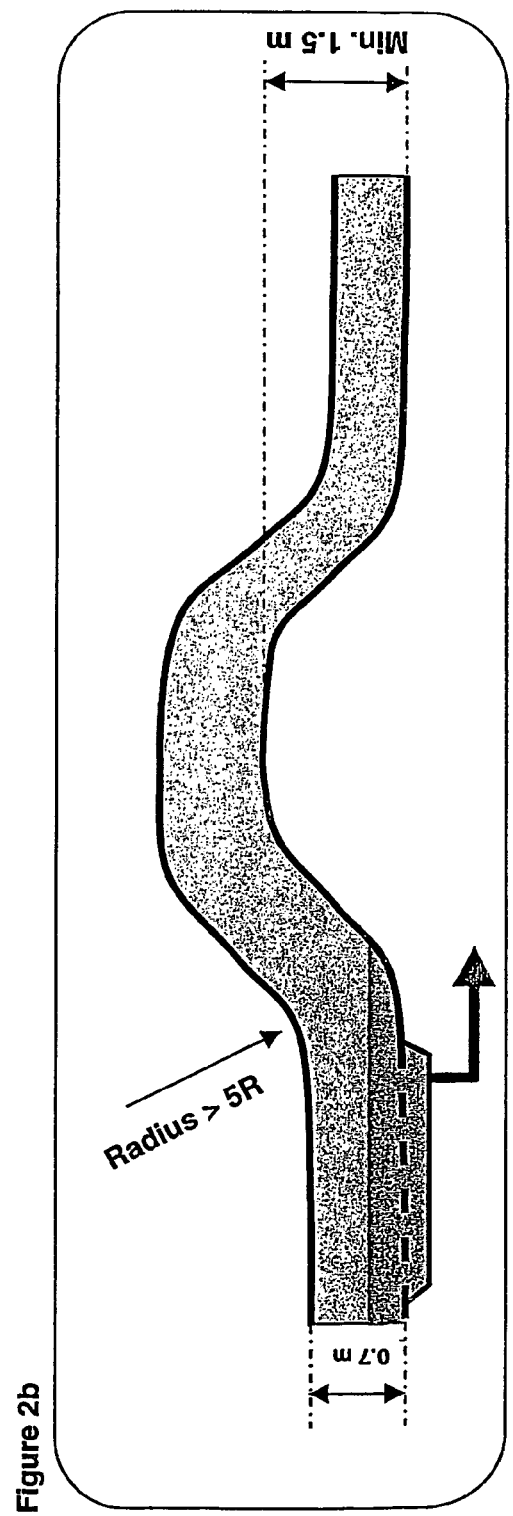
Figure 2b

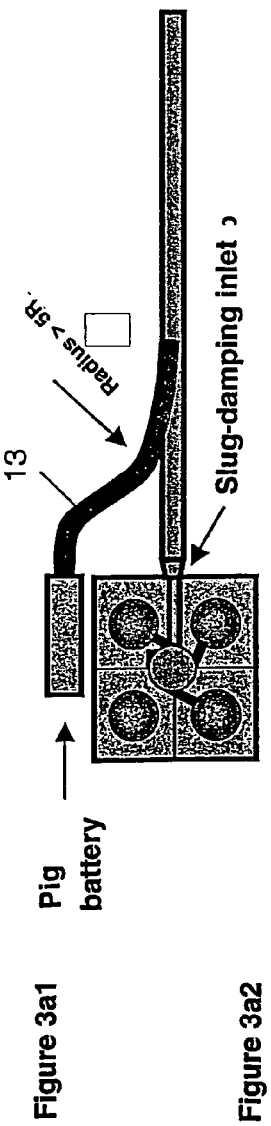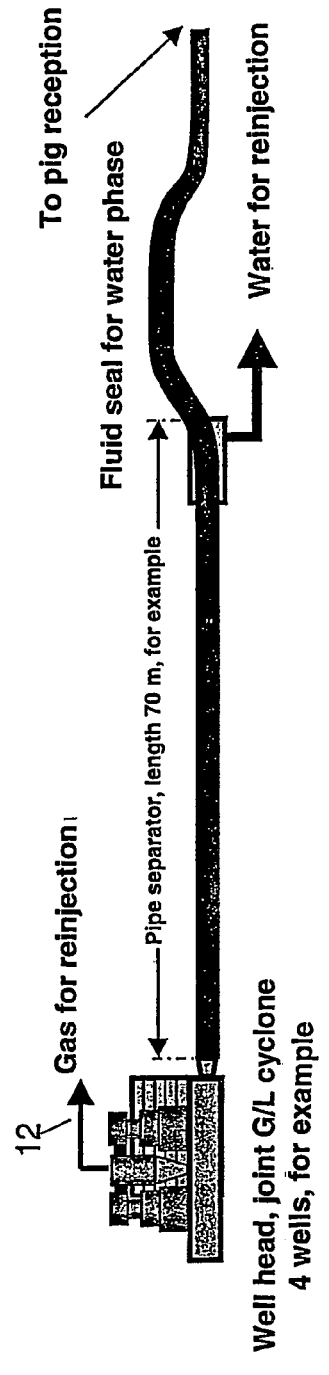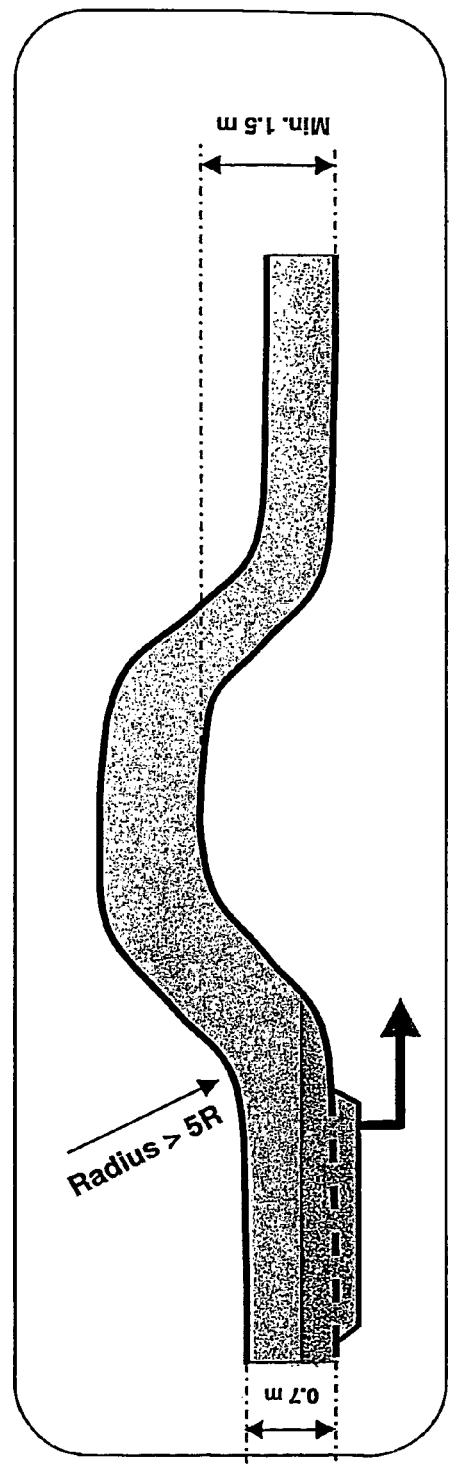
Figure 3a1
Figure 3a2
Figure 3b

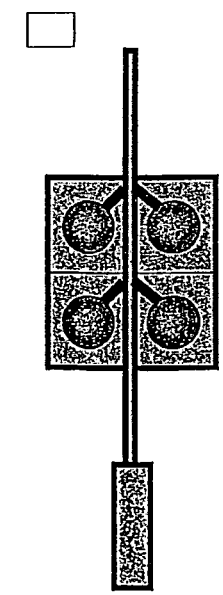
Figure 4a1
Figure 4a2
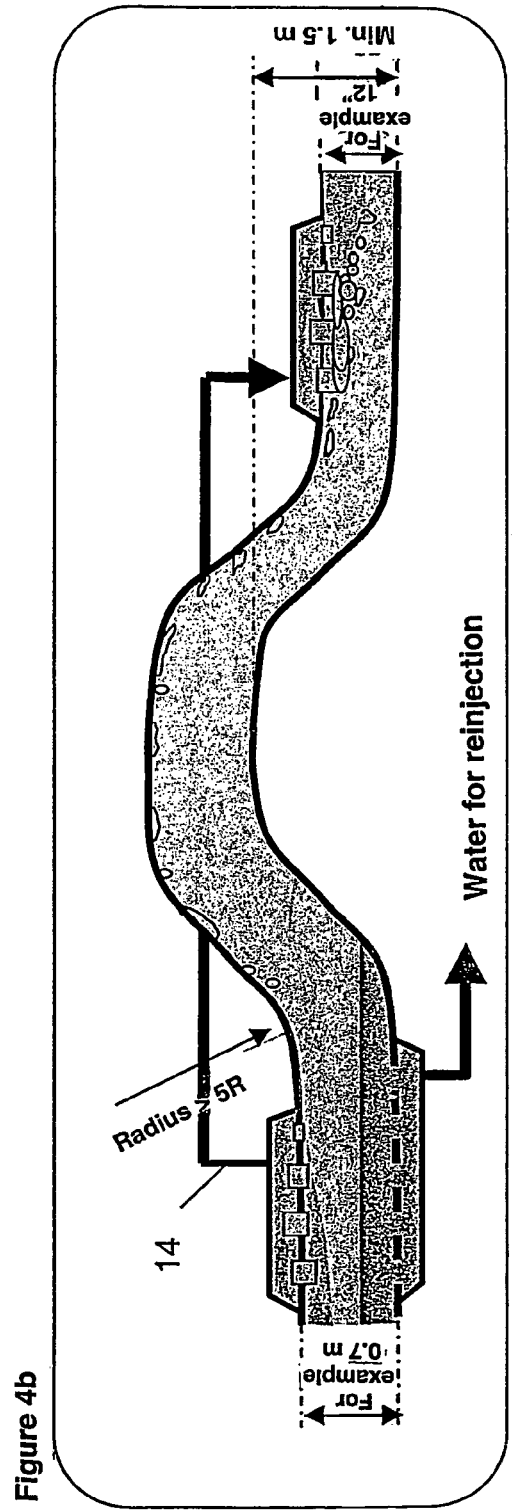
Figure 4b

PIPE SEPARATOR FOR THE SEPARATION OF FLUIDS, PARTICULARLY OIL, GAS AND WATER

BACKGROUND OF THE INVENTION

The present invention concerns a pipe separator for the separation of fluids, for example separation of oil, gas and water in connection with the extraction and production of oil and gas from formations beneath the sea bed, comprising a pipe-shaped separator body with an inlet and outlet cross-section that principally corresponds to the transport pipe to which the pipe separator is connected. "Principally" means that the separator body may have a slightly larger diameter that is necessary to achieve stratified gas, oil and water flows in the separator.

The applicant's own Norwegian patent applications nos. 19994244, 20015048, 20016216 and 20020619 describe prior art pipe separators for the separation of oil, water and/or gas downhole, on the sea bed or at the surface. However, these solutions have the disadvantage that they cannot be cleaned internally with mechanical devices, so-called "pigs" or reamers.

SUMMARY OF THE INVENTION

The present invention represents a pipe separator solution in which it is possible to use such devices. The present invention is characterised in that a pipe bend or loop is arranged in the pipe separator or in connection with its outlet to form a downstream fluid seal in relation to the pipe separator, which is designed to maintain a fluid level in the fluid separator, but which also allows the separator and the loop to be reamed.

BRIEF DESCRIPTION OF THE DRAWINGS

The present invention will be described in further detail in the following by means of examples and with reference to the attached figures, in which:

FIGS. 1$a$1, 1$a$2 and 1$b$ show a principle drawing of a pipe separator with a fluid seal in accordance with the present invention partly seen from above (FIG. a1) and from the side (FIG. 1$a$2), and FIG. 1$b$ shows an elevation of the fluid seal itself. In an enlarged scale;

FIGS. 2$a$1, 2$a$2 and 2$b$ show an alternative embodiment of a pipe separator with a fluid seal;

FIGS. 3$a$1, 3$a$2 and 3$b$ show an alternative embodiment of a pipe separator with a fluid seal;

FIGS. 4$a$1, 4$a$2 and 4$b$ show an alternative embodiment of a pipe separator with a fluid seal.

DETAILED DESCRIPTION OF THE INVENTION

Figure 5:
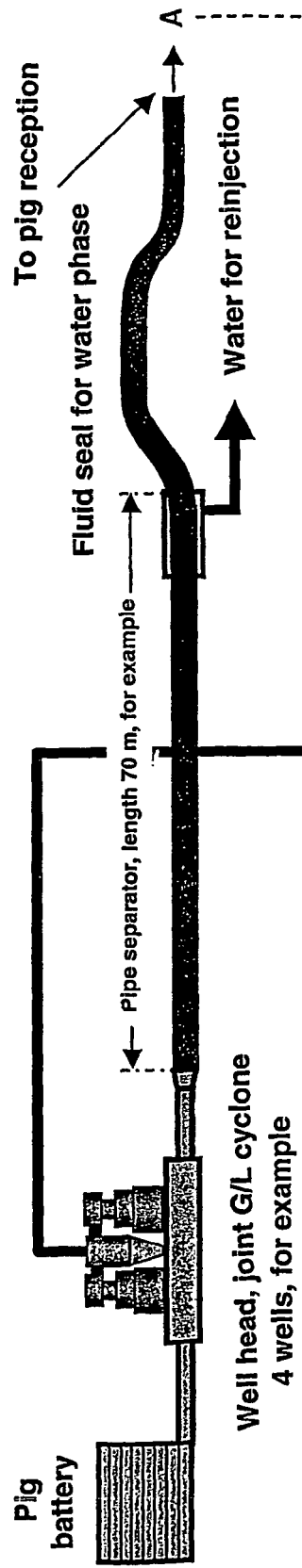
FIGS. 5 and 6 show an alternative embodiment of a pipe separator constructed in accordance with the present invention.

As stated above, FIG. 1 shows a pipe separator 1 with a fluid seal 2 in accordance with the present invention. The pipe separator is connected via a transport pipe/supply pipe 7 to a well head 5 having four wells 6, as shown. Upstream of the well head 5, there is a pig magazine 8 with pigs (not shown) for pigging the downstream pipe, separator and fluid seal 7, 1, 2. The fluid seal 2 is downstream in the separator 1 and constitutes, in the example shown here and subsequent examples, an integrated part of the separator itself. The fluid seal 2 is designed as a pipe bend or loop that extends from the mainly horizontal end part 3 of the separator upwards and then downwards and across in a mainly horizontal outlet part of the separator or outlet pipe/transport pipe 4.

When designing the fluid seal 2, it is, of course, necessary to ensure that the radiuses of curvature are large enough to ensure that pigs and other relevant equipment can pass through easily.

In the above, the expression "fluid seal" is used in connection with the present invention to illustrate that the present invention can be used to separate any type of fluid consisting of two or more fluid components. However, as the example shown in the figures concerns the production of oil and gas, here it is a "water seal" for the removal of separated water from the oil flow. At the transition to the water seal 2, upstream of it, there is, therefore, a recess 9, expediently with a perforation on top of it, for draining water from the separator via a drainage pipe 10. The perforation prevents the reamer from entering the drainage opening and ensures a smooth inflow along the flow path over the recess 9. The water can be reinjected in an adjoining injection well or transported away for treatment or storage in a tank or the like (not shown).

The method of operation of the present invention is thus that oil and water, possibly including small quantities of gas, that flow from the well head 5 are separated in the separator and the oil and the small quantity of gas that is present flow through the fluid seal and on to the transport pipe 4, while the separated water is drained from the separator via the pipe 10. The separator can expediently be equipped with a phase measuring device and phase regulator to control the water level and ensure at all times that the necessary quantity of water is drained.

With the solution shown here, it is possible to ream or perform pigging of the separator and pipes connected in an easy manner.

FIG. 2 shows a solution similar to that shown in FIG. 1. Here, however, in a situation in which relatively large quantities of gas are produced (high gas/oil ratio), a cyclone is fitted in connection with the well head to separate the gas before the fluid is separated in the separator in order to avoid the formation of slugs, turbulence and the re-admixture of the fluid phase in the water seal. The gas that is separated in the cyclone can be conducted via a pipe 12 to a well nearby for reinjection or is conducted back in the transport pipe 4 downstream of the separator 1.

FIG. 3 shows an alternative solution similar to the solution shown in FIG. 2. After the well head 5, but before the separator 1, there is a slug damper 12 ahead of the inlet of the separator 1. As it will not be possible to send a pig through such a slug damper, the pig sender and pig battery 8 are arranged so that the supply pipe 13 for the pig is connected to the separator 1 downstream of the slug damper 12

FIG. 4 shows another alternative embodiment similar to the solution shown in FIG. 1. Here, however, the gas, with a high fluid/gas ratio, is conducted in a bypass pipe 14 past the water seal. The gas pipe 14 is expediently connected to the separator upstream of the water seal 2 and is connected to the transport pipe 4 downstream of the water seal.

Figure 6:
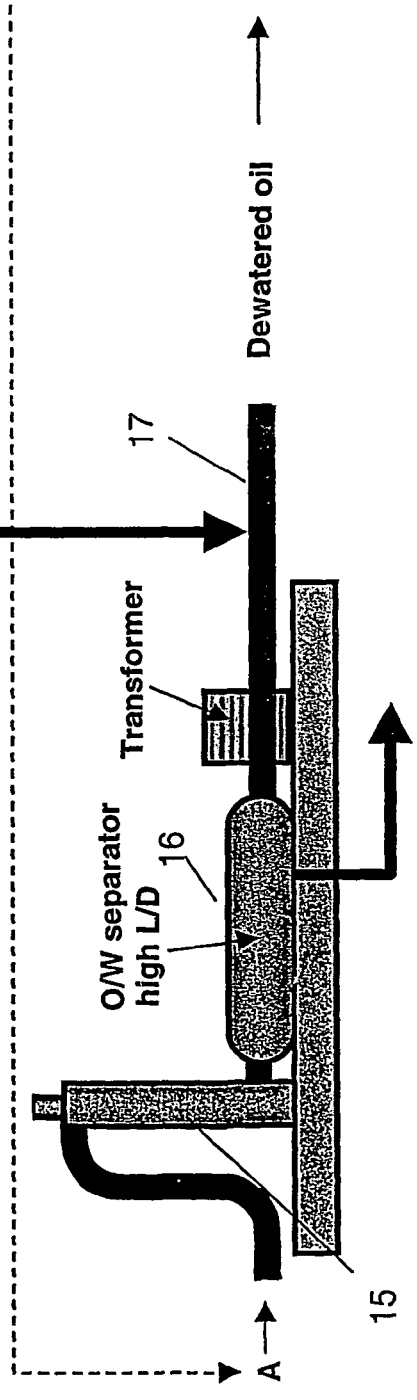

Yet another alternative embodiment is shown in FIGS. 5 and 6. The solution is intended to be used for medium-heavy oils with dewatering of the oil phase to 0.5% water and is based on the embodiment shown in FIG. 2 in which a cyclone 11 is used to separate gas before the pipe separator 1. The oil flow from the pipe separator 1 (FIG. 5) is conducted, after the water seal 2, to a downstream compact electrostatic coalescer 15 (FIG. 6) and subsequently to an additional oil/water separator 16 that separates any remaining water after the separation in the pipe separator 1. The gas from the cyclone 11 is conducted back to the oil flow in the transport pipe 17 after the additional oil/water separator 16.

The invention claimed is:

1. A fluid separator for the separation of fluids comprising oil and water in connection with the extraction and production of oil and gas from formations beneath the sea bed, the separator comprising:
- a pipe separator for separating the oil and the water, the pipe separator having an inlet and an outlet;
- a first transport pipe connected to the inlet of the pipe separator;
- a pipe bend, connected to the outlet of the pipe separator, for forming a downstream fluid seal in relation to the pipe separator and maintaining a fluid level in the pipe separator, wherein the pipe separator and the pipe bend are arranged to permit the pipe separator and the pipe bend to be pigged;
- a drainage pipe for draining the separated water from the separator; and
- a second transport pipe, connected to a downstream end of the pipe bend, for transporting the separated oil.

2. A fluid separator in accordance with claim 1, further comprising a well head disposed upstream of the pipe separator, a cyclone connected to the well head for the separation of gas, and a pipe connected to the second transport pipe for conducting the gas back to the second transport pipe downstream of the pipe separator.

3. A fluid separator in accordance with claim 1, further comprising a gas bypass pipe for conducting gas around the pipe bend, wherein an inlet of the gas bypass pipe is connected upstream of the pipe separator, and an outlet of the gas bypass is connected to the second transport pipe disposed downstream of the pipe separator.

4. A fluid separator in accordance with claim 1, further comprising a compact electrostatic coalescer, and an additional separator disposed downstream of the compact electrostatic coalescer, wherein separated fluid from the additional separator can be conducted to a nearby well.

5. A fluid separator in accordance with claim 2, further comprising a compact electrostatic coalescer and an additional separator disposed downstream of the compact electrostatic coalescer, wherein gas from the cyclone can be conducted to the second transport pipe downstream of the additional separator, and separated fluid from the additional separator can be conducted to a nearby well.

6. A fluid separator in accordance with claim 1, wherein the pipe bend includes a first section extending upwardly from the pipe separator, a second portion extending downwardly to the second transport pipe.

* * * * *